(No Model.)

J. MACDONALD.
SHAFT COLLAR.

No. 422,025. Patented Feb. 25, 1890.

Witnesses:
J. Halpenny.
David Stevens.

Inventor:
James Macdonald
By Gridley & Fletcher
his Atty's.

UNITED STATES PATENT OFFICE.

JAMES MACDONALD, OF CHICAGO, ILLINOIS, ASSIGNOR TO THE WEBSTER & COMSTOCK MANUFACTURING COMPANY, OF SAME PLACE.

SHAFT-COLLAR.

SPECIFICATION forming part of Letters Patent No. 422,025, dated February 25, 1890.

Application filed October 7, 1889. Serial No. 326,174. (No model.)

*To all whom it may concern:*

Be it known that I, JAMES MACDONALD, of Chicago, in the county of Cook and State of Illinois, have invented a new, useful, and Improved Shaft-Collar, of which the following is a full, clear, and exact description, reference being had to the accompanying drawings, forming a part of this specification, in which—

Figure 1:
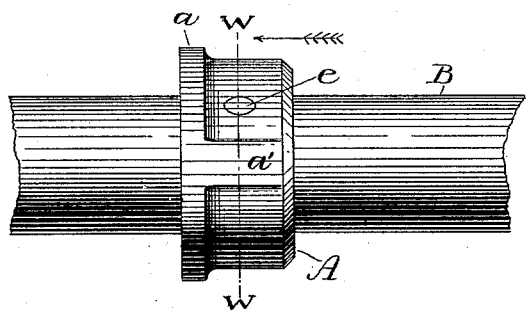
Figure 2:
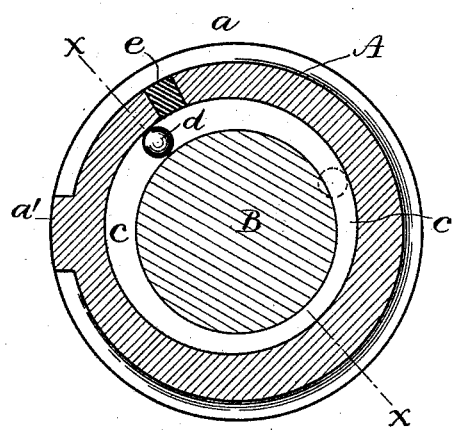
Figure 3:
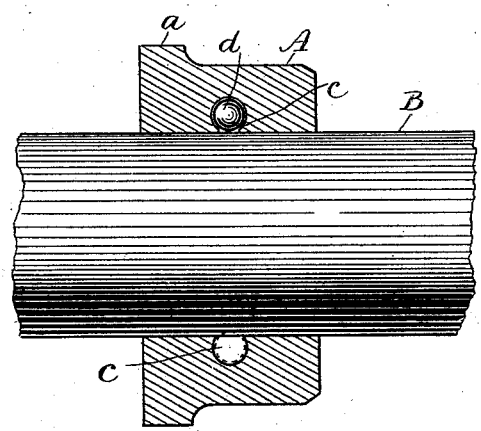
Figure 4:
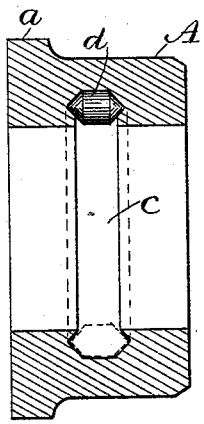

Figure 1 is a side view of a shaft and collar embodying my improvement. Fig. 2 is a sectional view of the same, taken upon the line W W, Fig. 1, viewed in the direction of the arrow there shown. Fig. 3 is a sectional view taken upon the line $xx$, Fig. 2; and Fig. 4 is a central longitudinal sectional view of a collar showing a modified construction.

Corresponding letters of reference in the different figures designate similar parts.

The object of my invention is to so construct a shaft-collar that it may be readily adjusted upon a shaft in any desired position and firmly secured in place without the employment of a set-screw or analogous device that may tend to endanger persons who may approach the shaft while in motion. A further object is to so construct said collar that the fastening device may be loosely secured in place, so that the collars may be kept in stock and be shipped to purchasers without disconnecting or separating the fastening device from the collar.

To these ends my invention consists in the combination of elements hereinafter more particularly described and claimed.

Referring to the drawings, A represents my improved collar, which in general shape and appearance, exclusive of the fastening device, may correspond to those heretofore in common use, with the exception that adjacent to the usual flange $a$ I provide a slight rib or projection $a'$, Figs. 1 and 2, which is intended for the purpose hereinafter stated, and should not be made to project beyond the circumference of the flange. Within the interior or bore of the collar in which the shaft B is inserted I provide an annular groove $c$, which is eccentric to the axis of the shaft B, as clearly shown in Fig. 2, and is preferably round in cross-section, as shown in Fig. 3. Within said groove I place a ball or roller $d$, of hardened steel, which is of a size to fit loosely within said groove and roll freely therein without falling out. Said ball or roller may be inserted within the groove from the outside through a bore, which is afterward closed by means of a plug $e$, Figs. 1 and 2. The extent of eccentricity of the groove $c$ to the axis of the bore in which it is formed should be such that when the ball is in the deepest portion of the groove it will lie below the surface of the bore, but when in the shallow portion of the groove it will protrude more or less therefrom into the space occupied by the shaft, as indicated in dotted lines in Figs. 2 and 3. It will thus be seen that when the ball is in the deep portion of the groove the shaft may be readily inserted within the bore of the collar; but when so inserted, if the collar is rotated upon the shaft, it causes the ball $d$ to press against the shaft until it becomes so tightly wedged in position that the collar becomes rigid, and the greater the strain upon it in that direction the more firmly it is fastened. As a simple means for so locking it in place, I provide the rib $a'$. If the collar is turned by hand until the ball becomes wedged, a hammer stroke upon the rib $a'$ will effectually serve to set it in place, and it will retain its position until driven in an opposite direction, when the ball may be easily loosened and the collar removed from or adjusted upon the shaft.

I have found by practice that the ball will embed itself into the shaft, and thus hold the collar in place with the utmost firmness, while it obviates the great danger to life incident to set-screws or other fastenings which project from the collar. Moreover, it is more easily and quickly adjusted than by means of a set-screw.

In Fig. 4 I have shown a modification of said invention in which, instead of the ball, I employ a cylindrical roller with conical-shaped ends, which the groove $c$ is made to fit. It is obvious that the shape of the ends may be varied from that shown and the groove made to conform thereto without varying from the essential principle of my invention.

Having described said invention, I claim—

A shaft-collar provided with a groove formed within and eccentric to the bore of said collar and a ball or roller placed loosely therein, said groove being so formed in cross-section as to prevent the ball or roller from falling out, while it is free to roll lengthwise of said groove, substantially as shown and described.

In testimony whereof I have signed this specification, in the presence of two subscribing witnesses, this 1st day of October, 1889.

JAMES MACDONALD.

Witnesses:
D. H. FLETCHER,
J. HALPENNY.